(12) United States Patent
Yabuki

(10) Patent No.: US 10,198,163 B2
(45) Date of Patent: Feb. 5, 2019

(54) ELECTRONIC DEVICE AND CONTROLLING METHOD AND PROGRAM THEREFOR

(71) Applicant: NEC CASIO MOBILE COMMUNICATIONS, LTD., Kanagawa (JP)

(72) Inventor: Masahiro Yabuki, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 329 days.

(21) Appl. No.: 14/406,377

(22) PCT Filed: Jun. 6, 2013

(86) PCT No.: PCT/JP2013/065733
§ 371 (c)(1),
(2) Date: Dec. 8, 2014

(87) PCT Pub. No.: WO2013/183722
PCT Pub. Date: Dec. 12, 2013

(65) Prior Publication Data
US 2015/0160842 A1    Jun. 11, 2015

(30) Foreign Application Priority Data

Jun. 8, 2012    (JP) ................................. 2012-130755

(51) Int. Cl.
*G06F 3/0488*    (2013.01)
*G06F 3/0485*    (2013.01)
(Continued)

(52) U.S. Cl.
CPC ...... *G06F 3/04845* (2013.01); *G06F 3/04886* (2013.01)

(58) Field of Classification Search
CPC ............... G06F 3/0488; G06F 3/04883; G06F 3/04886; G06F 3/0482; G06F 3/0485
See application file for complete search history.

(56) References Cited

U.S. PATENT DOCUMENTS 8,429,565 B2 *   4/2013   Agarawala .............. G06F 3/016
                                                          715/701
8,830,273 B2 *   9/2014   Amano ............... G06F 3/04883
                                                          345/661

(Continued)

FOREIGN PATENT DOCUMENTS

| CN | 101183292 | 5/2008 |
| CN | 101212752 | 7/2008 |

(Continued)

OTHER PUBLICATIONS

International Search Report, PCT/JP2013/065733, dated Aug. 20, 2013.

(Continued)

*Primary Examiner* — Jordany Nunez
(74) *Attorney, Agent, or Firm* — Young & Thompson

(57) ABSTRACT

An electronic device includes an input detection unit that detects a contact operation or a proximity operation made by a user; a display unit that includes a first display region displaying a first image showing a position where a first operation is received; and a control unit that changes display mode of the first display region based on a second operation when the input detection unit detects the second operation and that has a second image displayed in a second display region where a third operation is received.

13 Claims, 15 Drawing Sheets

(51) Int. Cl.
*G06F 3/0481* (2013.01)
*G06F 3/0484* (2013.01)

(56) References Cited

U.S. PATENT DOCUMENTS

| | | | |
|---|---|---|---|
| 9,489,107 B2* | 11/2016 | Duarte | G06F 3/0481 |
| 9,626,013 B2* | 4/2017 | Asanuma | G06F 3/041 |
| 9,804,707 B2* | 10/2017 | Durojaiye | G06F 3/03545 |
| 2003/0107604 A1 | 6/2003 | Ording | |
| 2004/0183834 A1 | 9/2004 | Chermesino | |
| 2007/0130539 A1 | 6/2007 | Yamagishi et al. | |
| 2008/0119237 A1 | 5/2008 | Kim | |
| 2008/0158189 A1* | 7/2008 | Kim | G06F 3/04886 345/173 |
| 2009/0249235 A1 | 10/2009 | Kim et al. | |
| 2010/0079392 A1 | 4/2010 | Chiang et al. | |
| 2010/0097321 A1 | 4/2010 | Son et al. | |
| 2010/0127994 A1 | 5/2010 | Aono et al. | |
| 2010/0241989 A1 | 9/2010 | Wen | |
| 2010/0248788 A1 | 9/2010 | Yook et al. | |
| 2010/0283737 A1* | 11/2010 | Miyazawa | G06F 3/0488 345/168 |
| 2011/0109567 A1* | 5/2011 | Kim | G06F 1/1641 345/173 |
| 2011/0124376 A1 | 5/2011 | Kim et al. | |
| 2011/0164053 A1 | 7/2011 | Nakamura et al. | |
| 2012/0044170 A1* | 2/2012 | Homma | G06F 3/04886 345/173 |
| 2012/0056829 A1* | 3/2012 | Kasahara | G06F 3/0488 345/173 |
| 2012/0075231 A1* | 3/2012 | Kwahk | G06F 3/04886 345/173 |
| 2012/0113007 A1* | 5/2012 | Koch | G06F 3/0488 345/168 |
| 2012/0176322 A1 | 7/2012 | Karmi | |
| 2012/0200503 A1* | 8/2012 | Berenger | G06F 3/04886 345/168 |
| 2012/0206363 A1* | 8/2012 | Kyprianou | G06F 3/04886 345/168 |
| 2012/0206370 A1* | 8/2012 | Ivanovic | G06F 3/04886 345/173 |
| 2013/0234942 A1* | 9/2013 | Yoo | G06F 3/04886 345/168 |
| 2013/0332881 A1 | 12/2013 | Yook et al. | |
| 2015/0012869 A1* | 1/2015 | Artigue | G06F 3/04886 715/773 |
| 2015/0177826 A1* | 6/2015 | Aizawa | G06F 3/01 345/173 |
| 2015/0212683 A1* | 7/2015 | Arita | G09G 5/00 715/786 |
| 2016/0196051 A1* | 7/2016 | Han | G06F 3/0481 715/798 |
| 2017/0242538 A1* | 8/2017 | Chaudhri | G06F 3/0416 |
| 2018/0046349 A1* | 2/2018 | Chan | G06F 3/0416 |
| 2018/0210643 A1* | 7/2018 | Ghassabian | G06T 11/60 |

FOREIGN PATENT DOCUMENTS

| | | |
|---|---|---|
| CN | 101686280 | 3/2010 |
| CN | 102096446 | 6/2011 |
| CN | 102365617 | 2/2012 |
| JP | 2001-215943 | 8/2001 |
| JP | 2002-055753 | 2/2002 |
| JP | 2002-297293 A | 10/2002 |
| JP | 2005-310039 A | 11/2005 |
| JP | 2007-148783 | 6/2007 |
| JP | 2007241410 A | 9/2007 |
| JP | 2009-122890 | 6/2009 |
| JP | 2010-067129 | 3/2010 |
| JP | 2010-134625 | 6/2010 |
| JP | 2014501998 A | 1/2014 |
| WO | 2010110613 | 9/2010 |

OTHER PUBLICATIONS

Extended European Search Report—PCT/JP2013/065733—dated Nov. 4, 2015.
Chinese Official Action—2013800297990—dated Nov. 28, 2016.
Japanese Office Action dated Sep. 11, 2017; Application No. 2014-520050.
Chinese Official Action—201380029799.0—dated Jul. 17, 2017.
Japanese Office Action issued Application No. 2014-520050, dated Mar. 27, 2018 with English Translation.

* cited by examiner

ELECTRONIC DEVICE AND CONTROLLING METHOD AND PROGRAM THEREFOR

REFERENCE TO RELATED APPLICATION

This application is based upon and claims the benefit of the priority of Japanese Patent Application No. 2012-130755 filed on Jun. 8, 2012, the disclosure of which is incorporated herein in its entirety by reference thereto.

The present invention relates to an electronic device and controlling method and program therefor, and particularly to an electronic device comprising a touch panel and a controlling method and program therefor.

BACKGROUND

In recent years, an electronic device comprising a touch panel often has a liquid crystal panel and the touch panel integrated. Such an electronic device often comprises a software keyboard displayed by software. However, depending on its size or position, the software keyboard may interfere with the user's operation.

Patent Literature 1 discloses a technology that controls the size of a software keyboard according to a user's operation.

Patent Literature 2 discloses a technology that displays a software keyboard while dividing the image thereof according to a user's operation.

Patent Literature 1
Japanese Patent Kokai Publication No. JP2009-122890A
Patent Literature 2
Japanese Patent Kokai Publication No. JP2010-134625A

SUMMARY

As described above, a software keyboard may interfere with the user's operation, depending on its size or position. In particular, with a small device such as a smartphone, a software keyboard sometimes occupies one half of the display screen area.

For instance, let's assume a case where a user is performing a more detailed search based on search results using a Web browser. At this time, if the area of the software keyboard is large, it may be difficult for the user to perform an input operation while browsing the search results.

Further, for instance, let's assume a case where a user launches a Web browser and refers to information regarding the people registered in an address book in the middle of his input operation. In this case, the user first quits the Web browser currently running. Then, he launches the address book application. After confirming the information, the user quits the address book application. Then, after launching the Web browser again, the user has a software keyboard displayed to enter the information. As described, the user must perform a plurality of operations when he refers to information included in another application while using the software keyboard.

The technologies disclosed in Patent Literatures 1 and 2 do not allow a user to refer to information included in another application while using a software keyboard.

Therefore, there is a need in the art to contribute to facilitating an operation independent from a software keyboard while the software keyboard is being used.

According to a first aspect, there is provided an electronic device comprising an input detection unit that detects a contact operation or a proximity operation performed by a user; a display unit that includes a first display region displaying a first image showing a position where a first operation is received; and a control unit that changes display mode of the first display region based on a second operation when the input detection unit detects the second operation and that has a second image displayed in a second display region where a third operation is received.

According to a second aspect, there is provided a controlling method for an electronic device comprising a display unit that includes a first display region, and the controlling method comprises detecting a contact operation or a proximity operation performed by a user; displaying a first image that shows a position where a first operation is received in the first display region; and changing display mode of the first display region based on a second operation when the second operation is detected and having a second image displayed in a second display region where a third operation is received.

Further, the present method is associated with a particular machine, which is an electronic device comprising a display unit.

According to a third aspect, there is provided a program executed by a computer that controls an electronic device comprising a display unit that includes a first display region, and the program executes detecting a contact operation or a proximity operation performed by a user; displaying a first image that shows a position where a first operation is received in the first display region; and changing display mode of the first display region based on a second operation when the second operation is detected and having a second image displayed in a second display region where a third operation is received.

Further, this program can be stored in a computer-readable storage medium. The storage medium can be a non-transient one such as a semiconductor memory, hard disk, magnetic storage medium, and optical storage medium. The present invention can be embodied as a computer program product.

According to each aspect of the present invention, an electronic device contributing to facilitating an operation independent from a software keyboard while the software keyboard is being used, and a controlling method and program therefor are provided.

PREFERRED MODES

First, a summary of an exemplary embodiment of the present invention will be given using FIG. 1. Note that drawing reference signs in the summary are given to each element for convenience as examples solely for facilitating understanding, and the description of the summary is not intended to suggest any limitation.

As described above, when performing an input operation on a software keyboard, a user sometimes refers to information included in another application. Therefore, an electronic device that enables the user to easily perform an operation independent from the software keyboard while using the software keyboard is desired.

Figure 1:
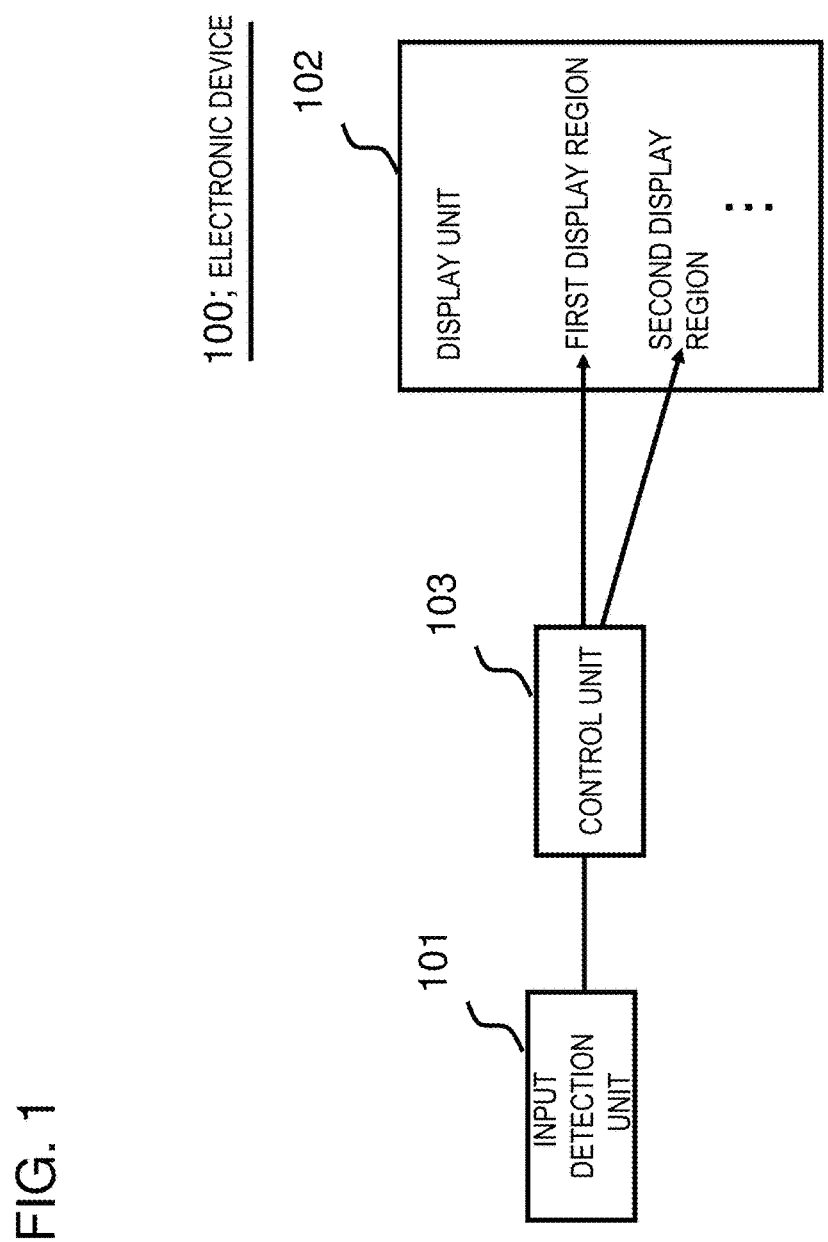
FIG. 1 is a drawing for explaining an exemplary embodiment.

An electronic device 100 shown in FIG. 1 is provided as an example. The electronic device 100 comprises an input detection unit 101 that detects a contact operation or a proximity operation performed by the user; a display unit 102 that includes a first display region displaying a first image showing a position where a first operation is received; and a control unit 103 that changes display mode of the first display region based on a second operation when the input detection unit 101 detects the second operation and that has a second image displayed in a second display region where a third operation is received.

The electronic device 100 is capable of receiving operations independent from each other for a plurality of display regions. For instance, let's assume that a software keyboard (the first image) that receives an input operation (the first operation) is displayed in the first display region on the electronic device 100. In this case, while displaying the software keyboard based on one operation (the second operation), the electronic device 100 is able to display an image that receives another operation (the third operation). At this time, the electronic device 100 changes the display mode (the image size, etc.) of the software keyboard. Therefore, the electronic device 100 contributes to facilitating an operation independent from the software keyboard while the software keyboard is being used.

Concrete exemplary embodiments will be described below in more detail with reference to the drawings.

[Exemplary Embodiment 1]

A first exemplary embodiment will be described in more detail with reference to the drawings.

Figure 2:
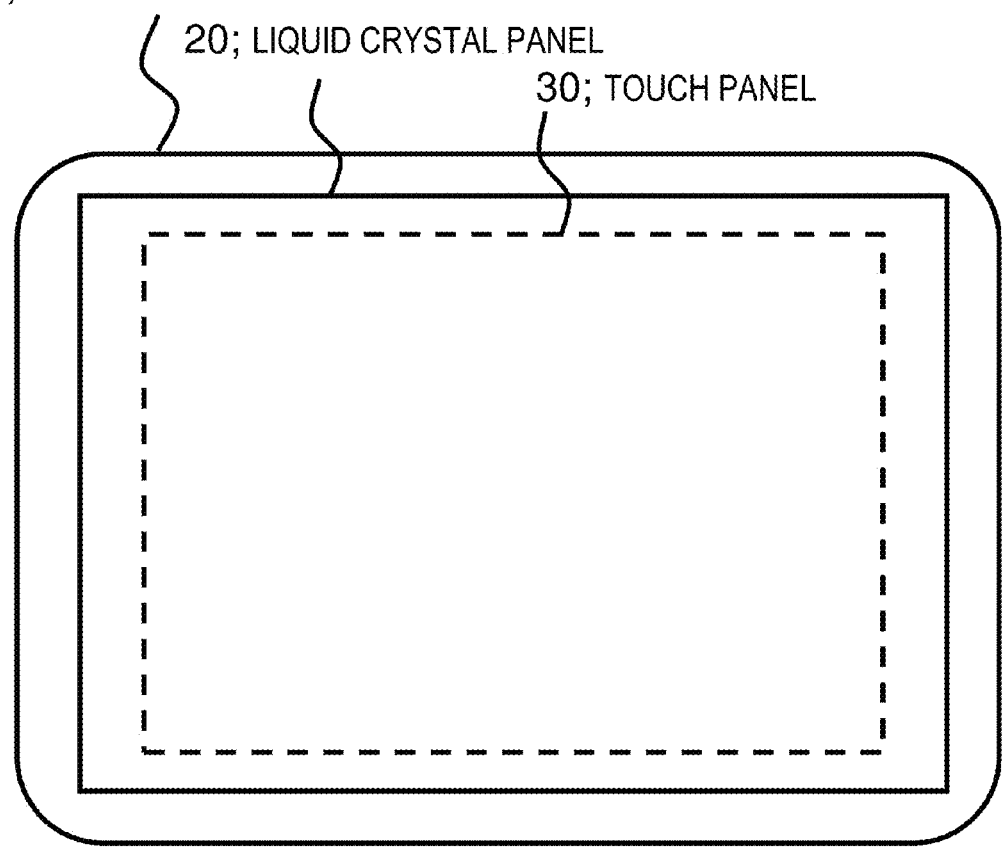
FIG. 2 is a plan view showing an example of the overall configuration of an electronic device 1 relating to a first exemplary embodiment.

FIG. 2 is a plan view showing an example of the overall configuration of an electronic device 1 relating to the present exemplary embodiment.

The electronic device 1 is constituted by including a liquid crystal panel 20 and a touch panel 30. The touch panel 30 is integrated into the liquid crystal panel 20.

Further, the liquid crystal panel 20 may be a different display device such as an organic EL (Electro Luminescence) panel. There are various color gradations for display devices, but any implementation method may be used for the electronic device 1 relating to the present exemplary embodiment.

Further, the touch panel 30 is a touch panel that detects with a sensor on a flat surface a contact operation or a proximity operation performed by the user. There are various touch panel methods such as an electrostatic capacitance method, but any method can be used. Further, the touch panel 30 is able to detect a plurality of contact points or proximity points simultaneously, i.e., a multi-point input (referred to as "multi-touch" hereinafter).

The electronic device 1 can take any form as long as it comprises the device shown in FIG. 2. For instance, a smartphone, portable audio device, PDA (Personal Digital Assistant), game device, tablet PC (Personal Computer), note PC, and electronic book reader correspond to the electronic device 1 of the present exemplary embodiment.

Figure 3:
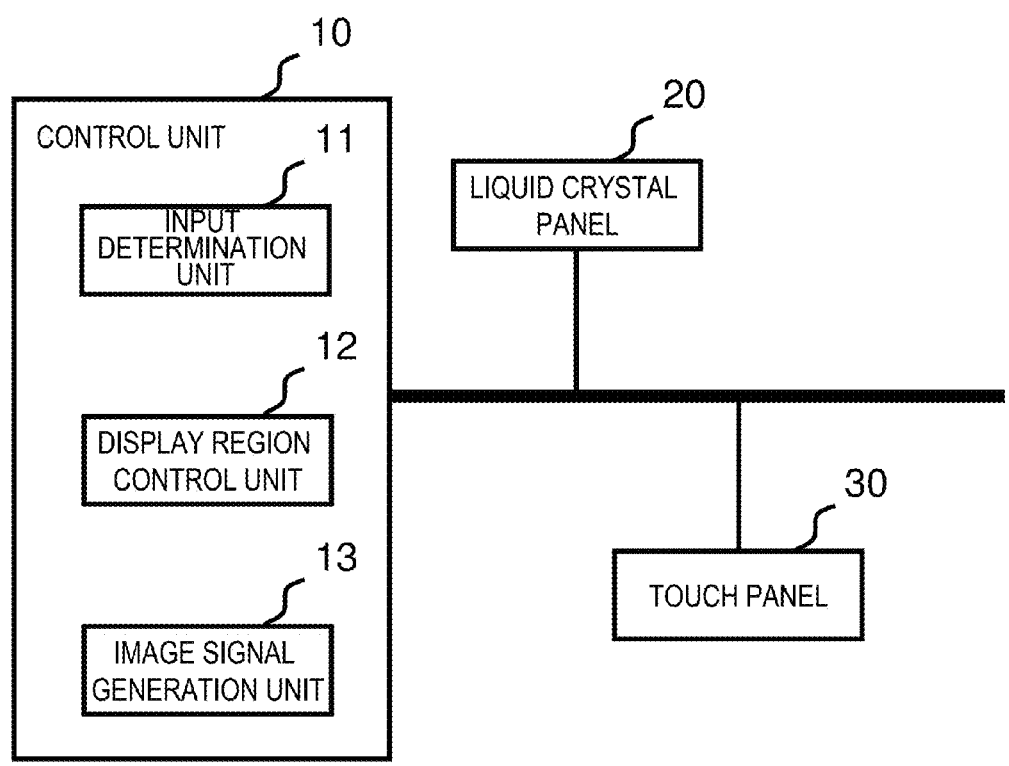
FIG. 3 is a drawing showing an example of the internal configuration of the electronic device 1.

FIG. 3 is a drawing showing an example of the internal configuration of the electronic device 1. The electronic device 1 is constituted by including a control unit 10, the liquid crystal panel 20, and the touch panel 30. The control unit 10 includes an input determination unit 11, a display region control unit 12, and an image signal generation unit 13. For the sake of simplicity, FIG. 3 only shows modules relevant to the electronic device 1 relating to the present exemplary embodiment.

The input determination unit 11 determines the detected positions and detected number of inputs detected by the touch panel 30. Further, the input determination unit 11 determines the type of a detected input operation. The input operation types include single tap operation, double tap operation, etc. In a single tap operation, the user lifts his finger off the surface immediately after touching (or getting close to) the surface of the touch panel 30. In a double tap operation, the user performs single tap operations twice continuously.

The input operation types also include so-called slide operation and flick operation. In a slide operation, the user moves his finger across the touch panel 30 for a predetermined period of time or longer, and lifts the finger after moving it over a predetermined distance or more. In other words, when the touch panel 30 detects an input lasting for a predetermined period of time or longer and moving over a predetermined distance or more, the input determination unit 11 determines that a slide operation has been performed.

Further, in a flick operation, the user flicks his finger against the surface of the touch panel 30. In other words, when the touch panel 30 detects an input moving less than a predetermined distance within a predetermined period of time, the input determination unit 11 determines that a flick operation has been performed.

The display region control unit 12 generates a plurality of display regions where images are displayed. The image signal generation unit 13 generates the image signal of an image related to an application for the generated display region. For the sake of simplicity, the generation of an image signal by the image signal generation unit 13 is described as the display of an image hereinafter.

Figure 4:
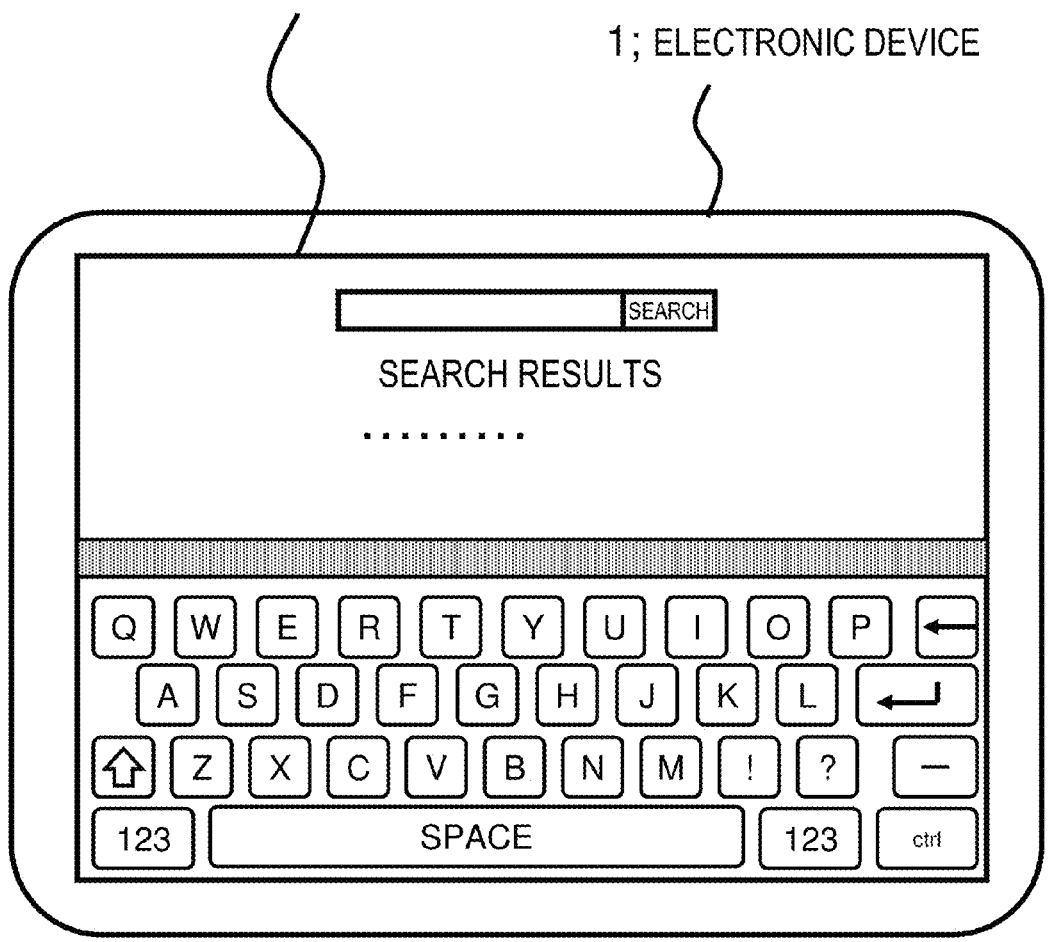
FIG. 4 is a drawing showing a display example of a liquid crystal panel 20.

FIG. 4 is a drawing showing a display example of the liquid crystal panel 20. In FIG. 4, a Web browser is launched and search results are shown. Further, a software keyboard is displayed to enter characters in FIG. 4.

Here, the software keyboard corresponds to the first image described above. Further, a display region displaying the software keyboard corresponds to the first display region described above. Moreover, an operation to enter characters on the software keyboard is the first operation described above.

First, a process of displaying images of different applications in a plurality of display regions will be described. In the description below, the process of displaying images of different applications in a plurality of display regions will be referred to as multi-screen display.

When the touch panel 30 detects a predetermined operation (corresponding to the second operation described above) at a predetermined position, the display region control unit 12 changes the size and position of the first display region. The second operation is referred to as multi-screen transition operation hereinafter. More concretely, the display region control unit 12 reduces the first display region according to the multi-screen transition operation. Then, the image signal generation unit 13 displays the software keyboard in the reduced first display region. Further, the image signal generation unit 13 displays an image of a second application in a region (referred to as the second display region hereinafter) made available due to the reduction of the first display region.

Further, the display region control unit 12 changes the position of the software keyboard according to the direction of the multi-screen transition operation. More concretely, the display region control unit 12 moves the first display region in the direction in which the detected position of the multi-screen transition operation moved.

Here, if a flick operation is detected as a multi-screen transition operation, the display region control unit 12 moves the first display region to a position within a predetermined range. Then the image signal generation unit 13 displays the software keyboard in the relocated first display region.

If a slide operation is detected as a multi-screen transition operation, the display region control unit 12 reduces the first display region and moves it to a position where the detected input position stopped. Then the image signal generation unit 13 displays the software keyboard in the relocated first display region. In other words, the display region control unit 12 reduces and displays the software keyboard according to the position where the user stopped his finger after performing a slide operation.

First, a case where the direction of the multi-screen transition operation is the direction of an angle within a predetermined range in relation to the horizontal or vertical direction will be described. In this case, it is preferred that the display region control unit 12 reduce and move the first display region so as to be able to put a side of the first display region against a side of the outer frame of the liquid crystal panel 20 closest to the direction of the multi-screen transition operation. Further, it is preferred that the display region control unit 12 move the center of the first display region in the direction of the side of the outer frame of the liquid crystal panel 20 closest to the direction of the multi-screen transition operation.

Next, a case where the direction of the multi-screen transition operation is a direction with a range exceeding a predetermined angle in relation to the horizontal and vertical directions will be described. In this case, it is preferred that the display region control unit 12 reduce and move the first display region so as to be able to fix a vertex of the first display region at a vertex of the outer frame of the liquid crystal panel 20 closest to the direction of the multi-screen transition operation. Further, it is preferred that the display region control unit 12 move the center of the first display region in the direction of the vertex of the outer frame of the liquid crystal panel 20 closest to the direction of the multi-screen transition operation.

Figure 5A:
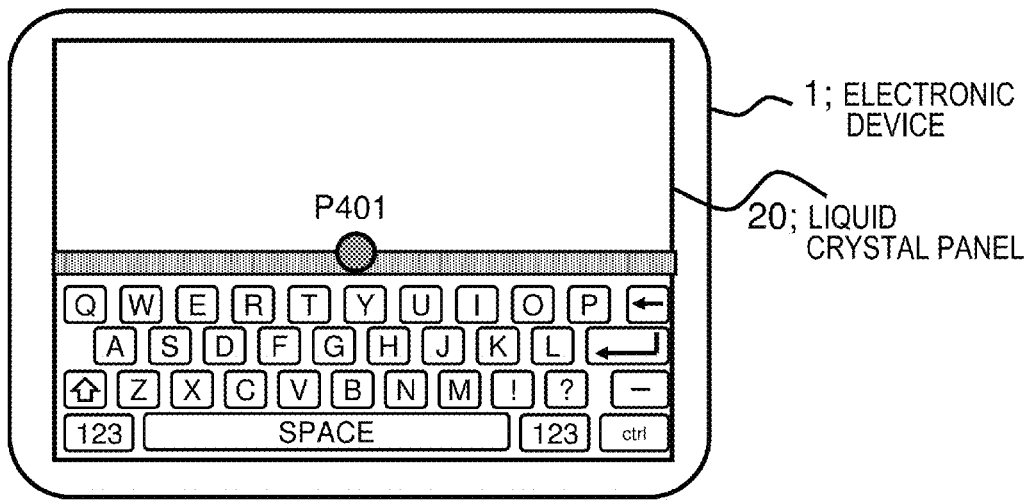
FIGS. 5A and 5B are drawings showing display mode examples of a software keyboard.
Figure 5B:
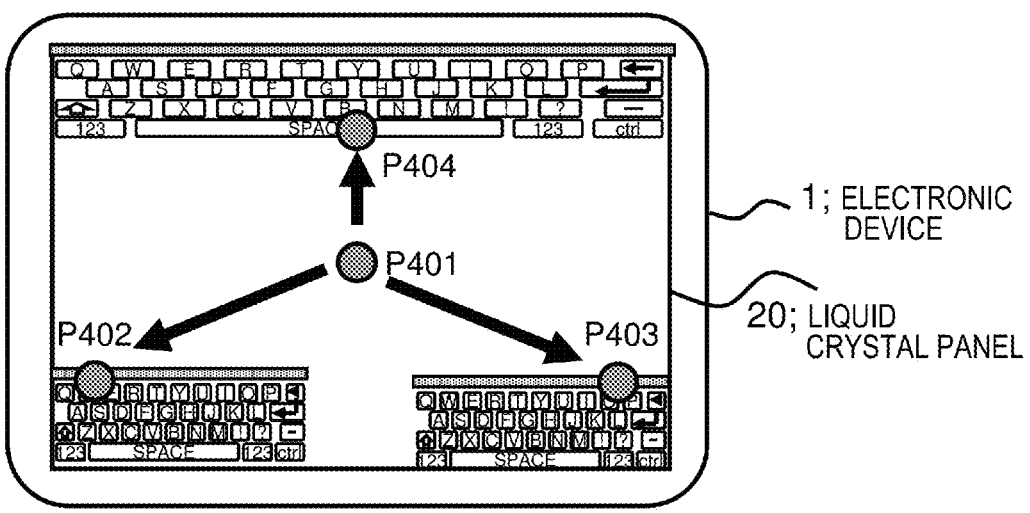

FIGS. 5A and 5B show an example of a display mode of the software keyboard. Points P 401 to P404 in FIGS. 5A and 5B represent positions where the touch panel 30 detects inputs. First, let's assume that the software keyboard is displayed as shown in FIG. 5A, and the touch panel 30 detects an input at the point P 401. Then the user performs a slide operation to the position of the point P 402 shown in FIG. 5B and stops his finger at the position of the point P 402. In other words, the position of the input detected by the touch panel 30 stops at the position of the point P 402. Here, the direction from the point P 401 to the point P 402 is assumed to be a direction with a range exceeding a predetermined angle in relation to the horizontal and vertical directions. Further, the vertex at the lower left corner of the outer frame of the liquid crystal panel 20 is closest to the point P 402. Therefore, the display region control unit 12 reduces and moves the first display region so as to fix the lower left vertex of the first display region at the lower left vertex of the outer frame of the liquid crystal panel 20. Then the image signal generation unit 13 displays the software keyboard in the relocated first display region. In other words, as shown in FIG. 5B, the image signal generation unit 13 displays the software keyboard in the lower left corner of the liquid crystal panel 20. Further, although this is not shown in the drawings, the image signal generation unit 13 displays an image of a second application in the display region made available by moving the software keyboard.

Next, a case where the user performs a slide operation in the direction from the point P 401 to the point P 403 will be discussed. Here, the direction from the point P 401 to the point P 403 is assumed to be a direction with a range exceeding a predetermined angle in relation to the horizontal and vertical directions. Further, the vertex at the lower right corner of the outer frame of the liquid crystal panel 20 is closest to the point P 403. Therefore, the display region control unit 12 reduces and moves the first display region so as to fix the lower right vertex of the first display region at the lower right vertex of the outer frame of the liquid crystal panel 20. Then the image signal generation unit 13 displays the software keyboard in the relocated first display region. In other words, the image signal generation unit 13 displays the software keyboard in the lower right corner of the liquid crystal panel 20.

Further, a case where the user performs a slide operation in the direction from the point P 401 to the point P 404 will be discussed. Here, the direction from the point P 401 to the point P 404 is assumed to be the direction of an angle within a predetermined range in relation to the vertical direction. Further, the upper side of the outer frame of the liquid crystal panel 20 is a side closest to the direction from the point P 401 to the point P 404. Therefore, the display region control unit 12 reduces and moves the first display region so as to put the upper side of the first display region against the upper side of the outer frame of the liquid crystal panel 20. Then the image signal generation unit 13 displays the software keyboard in the relocated first display region. In other words, the image signal generation unit 13 displays the software keyboard in the upper area of the liquid crystal panel 20.

Figure 6:
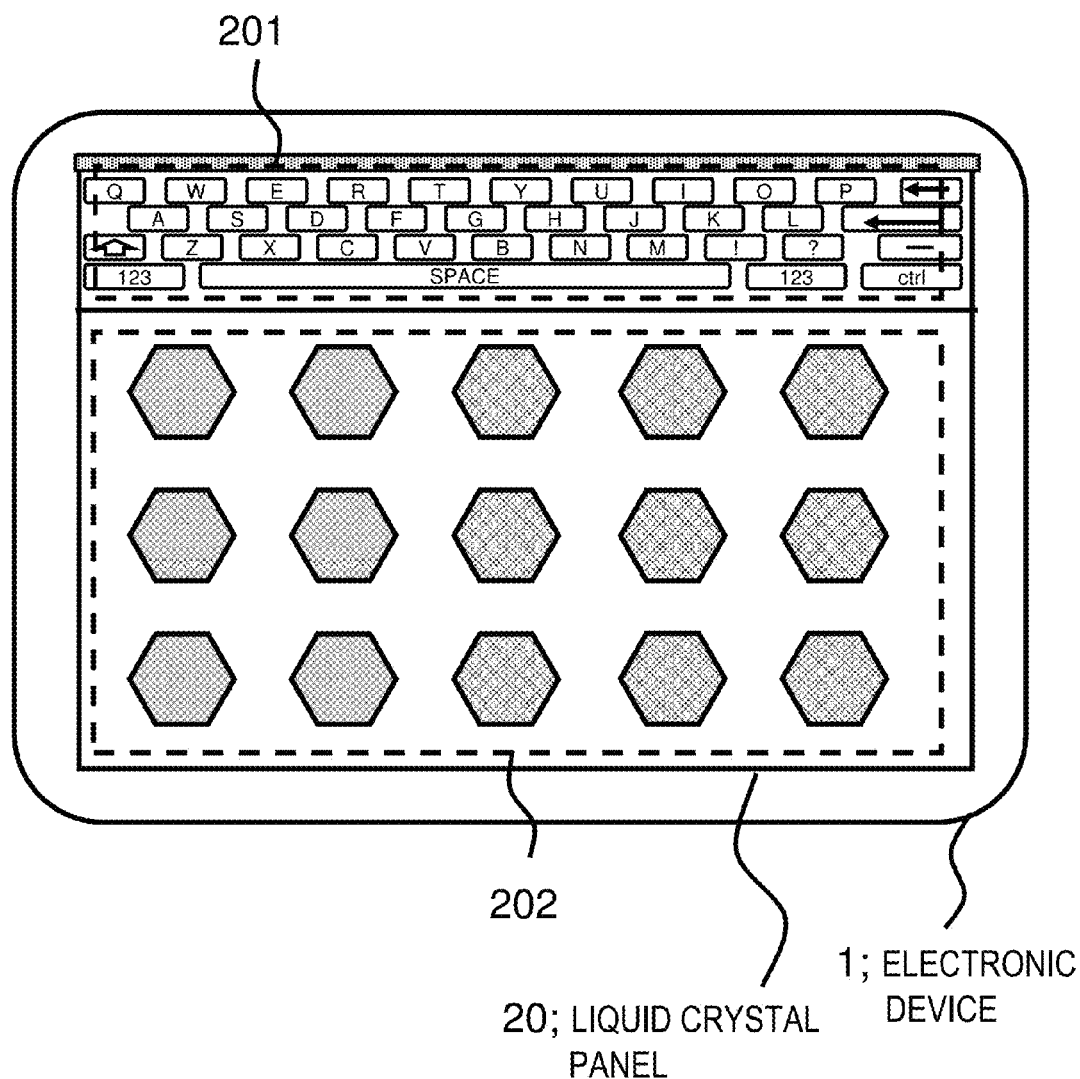
FIG. 6 is a drawing showing a display example of the liquid crystal panel 20.

FIG. 6 is a drawing showing an example in which a screen that displays icons and menus for running applications (referred to as the home screen hereinafter) and the software keyboard are displayed. In FIG. 6, the image signal generation unit 13 displays the software keyboard with its size reduced in the upper area of the liquid crystal panel 20. Here, the region made available by reducing the software keyboard is a second display region 202. In FIG. 6, the image signal generation unit 13 displays the home screen in the second display region 202.

As described, the electronic device 1 relating to the present exemplary embodiment is able to display a second application such as an address book application while having a first application such as a Web browser displayed.

Figure 7:
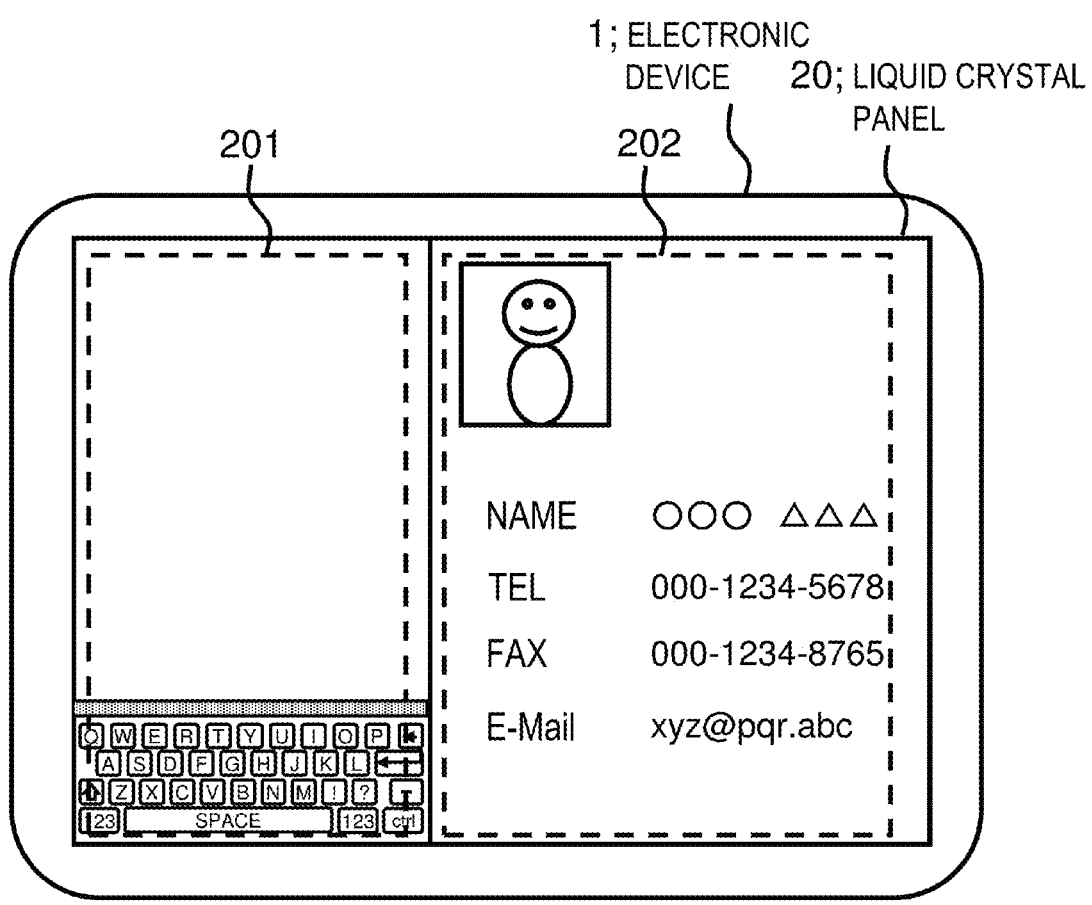
FIG. 7 is a drawing showing a display example of the liquid crystal panel 20.

FIG. 7 is a drawing showing an example in which different applications are displayed in a plurality of display regions. In FIG. 7, the software keyboard is reduced and displayed in a first display region 201. Further, an address book application is displayed in the second display region 202 in FIG. 7.

The display region control unit 12 may switch the display modes of the first and second display regions. More concretely, according to a predetermined operation, the display region control unit 12 may enlarge the reduced first display region and reduce the second display region. Here, it is preferred that the predetermined operation that switches the display modes be a simple and easy operation such as a double tap operation.

Figure 8:
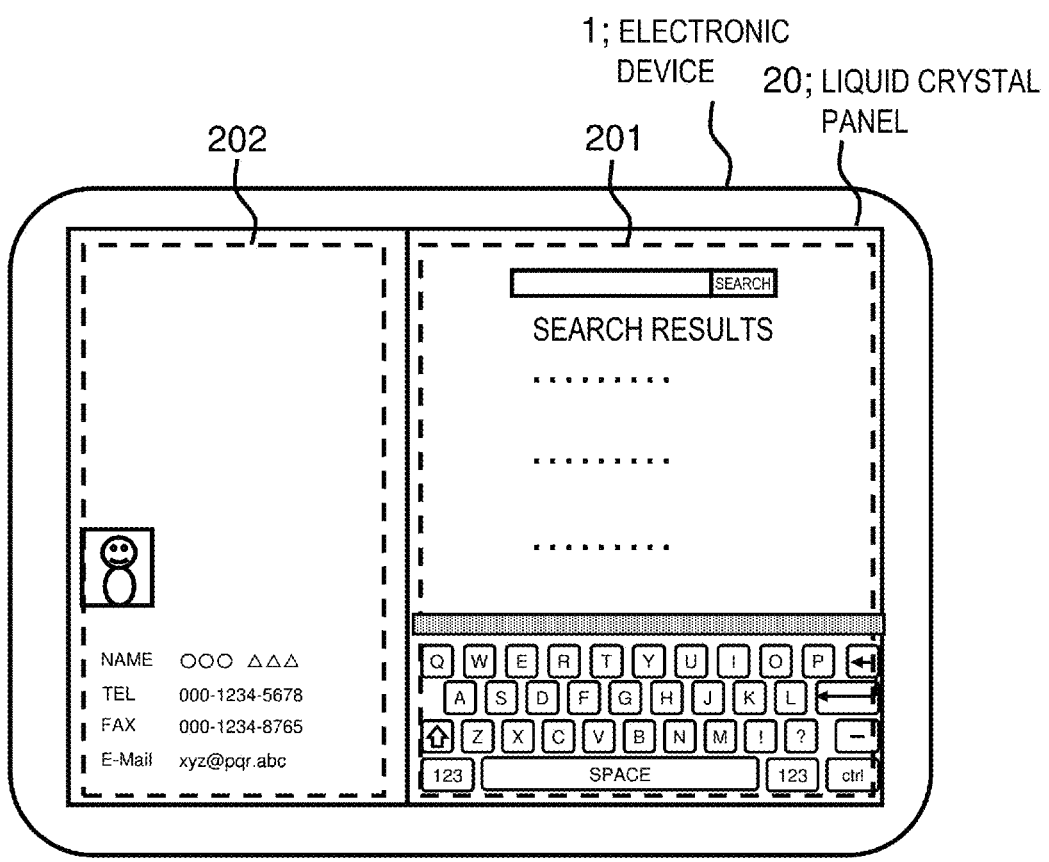
FIG. 8 is a drawing showing a display example of the liquid crystal panel 20.

FIG. 8 is a drawing showing an example in which the display modes are switched. In FIG. 8, the display of the software keyboard is enlarged and displayed in the first display region 201. Further, the address book application is reduced and displayed in the second display region 202.

The image signal generation unit 13 may have a third application displayed while displaying the images of two different applications. More concretely, when detecting a fourth operation in the second display region, the display region control unit 12 reduces and moves the second display region. It is preferred that the fourth operation be a simple and easy operation such as a double tap or flick operation. The image signal generation unit 13 displays the image of the third application in a region (a third region) made available by reducing the second display region. As described, the electronic device 1 relating to the present exemplary embodiment does not limit the number of applications displayed simultaneously.

Figure 9:
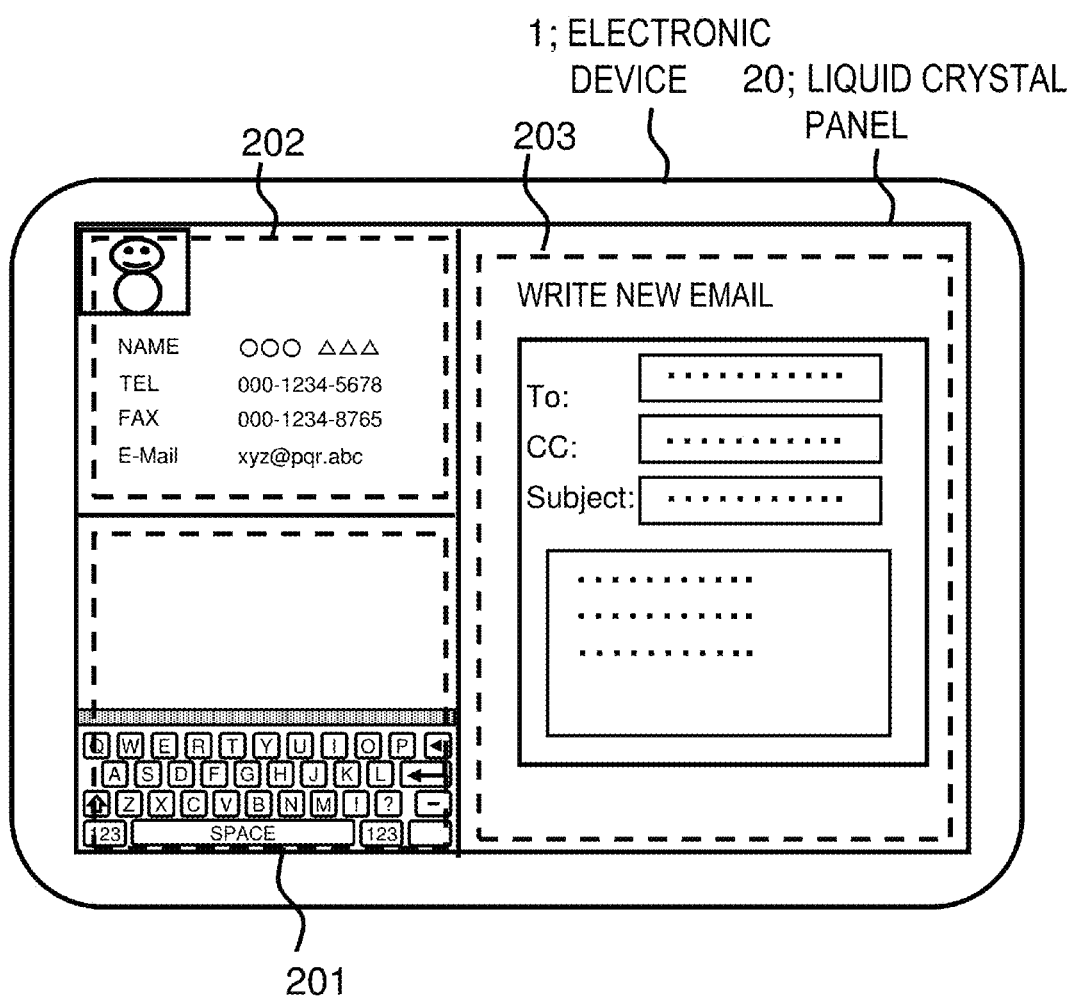
FIG. 9 is a drawing showing a display example of the liquid crystal panel 20.

FIG. 9 is a drawing showing an example in which the image of the third application is displayed on the liquid crystal panel 20. In FIG. 9, the software keyboard is displayed in the first display region 201. Further, the address book application is displayed in the second display region 202. Then, an email application is displayed in a third display region 203.

Next, a process of canceling a multi-screen display will be described.

It is preferred that an operation to cancel a multi-screen display be simply and easy. For instance, the input determination unit 11 may determine whether or not to cancel a multi-screen display depending on the presence of an input in the first display region. In other words, when the touch panel 30 continues to detect inputs in the first display region, the image signal generation unit 13 displays images in the first and second display regions. Then the control unit 10 executes processing on the second display region according to an operation thereon.

Here, as described above, the touch panel 30 detects a multi-touch. In other words, the touch panel 30 is able to detect inputs on the first and second display regions simultaneously. Therefore, the user can perform an operation on the second display region while contacting (being close to) the first display region.

Then, when the touch panel 30 stops detecting any input in the first display region, the display region control unit 12 stops displaying the second display region. Further, when the touch panel 30 stops detecting any input in the first display region, the display region control unit 12 enlarges the display of the first display region. In other words, when the user lifts his fingers that were in contact with (close to) the first display region, the display of the first display region is enlarged. At this time, the size of the first display region may be returned to the original one before the reduction. In the description below, the operation to hide the second display region and enlarge the display of the first display region is referred to as multi-screen cancellation operation.

Next, the operation of the electronic device 1 relating to the present exemplary embodiment will be described.

Figure 10:
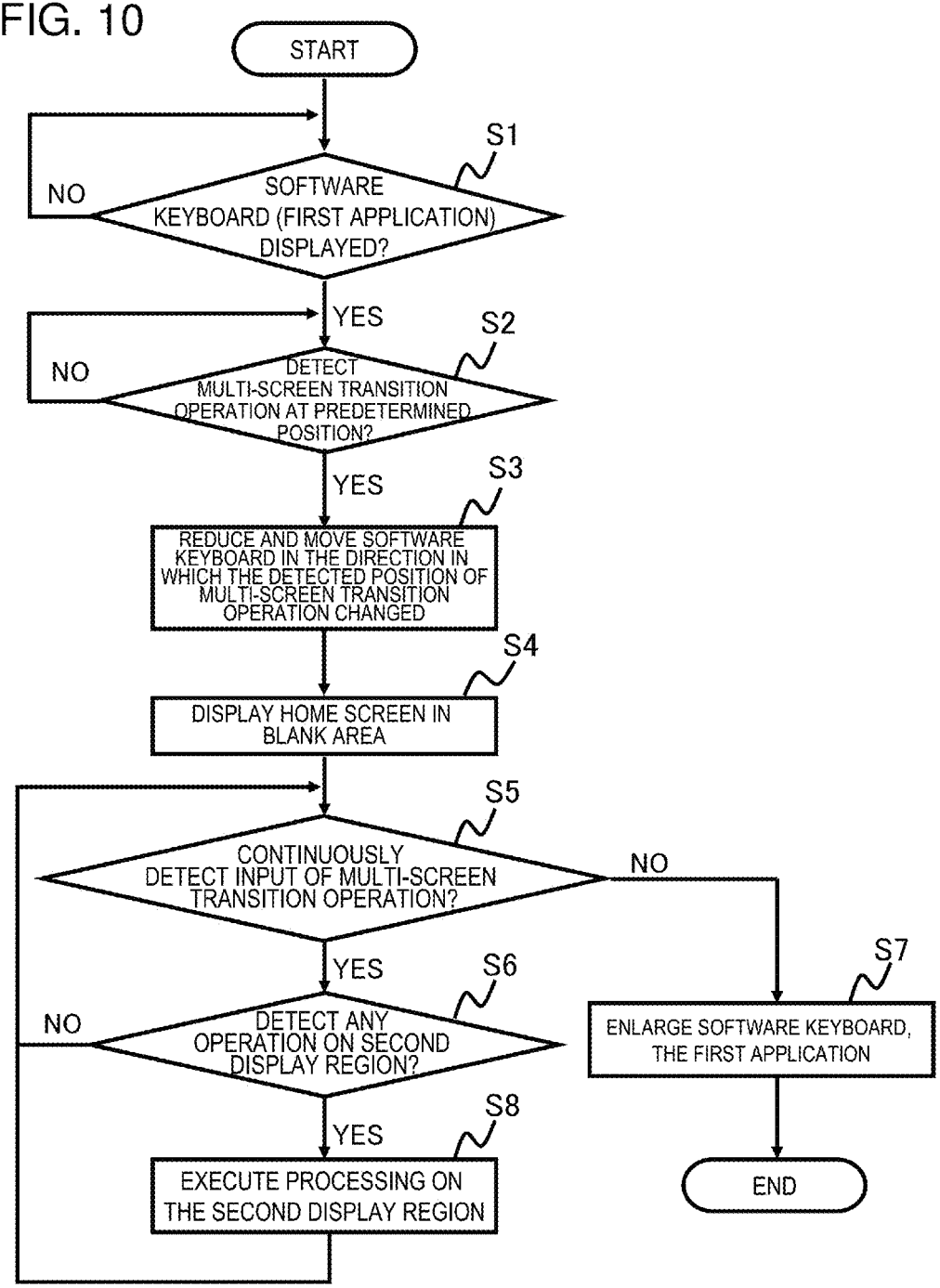
FIG. 10 is a flowchart showing an operation example of the electronic device 1 relating to the first exemplary embodiment.

FIG. 10 is a flowchart showing an operation example of the electronic device 1 relating to the present exemplary embodiment.

In step S1, the control unit 10 determines whether or not the software keyboard is displayed. When the software keyboard is displayed (Yes in the step S1), the process proceeds to step S2. When the software keyboard is not displayed (No in the step S1), the process returns to the step S1 and the processing is continued.

In the step S2, the input determination unit 11 determines whether or not the touch panel 30 detects a multi-screen transition operation. When a multi-screen transition operation is detected (Yes in the step S2), the process proceeds to step S3. When no multi-screen transition operation is detected (No in the step S2), the process returns to the step S2 and the processing is continued.

In step S3, the display region control unit 12 reduces and moves the first display region according to the direction in which the detected position of the multi-screen transition operation changed and to the distance of the change. More concretely, the display region control unit 12 may reduce the first display region so as to put it against the outer frame of the liquid crystal panel 20. Or the display region control unit 12 may reduce the first display region while fixing a vertex (corner) thereof. In this case, it is preferred that the display region control unit 12 fix a vertex out of those of the first display region closest to the direction in which the detected position of the multi-screen transition operation changed. Further, it is preferred that the display region control unit 12 move the center of the first display region when reducing it.

In step S4, the image signal generation unit 13 displays the home screen in the second display region.

In step S5, the input determination unit 11 determines whether or not the input of the multi-screen transition operation is continuously detected. When the input is continuously detected (Yes in the step S5), the process proceeds to step S6. When the input is not detected (No in the step S5), the process proceeds to step S7.

In the step S6, the input determination unit 11 determines whether or not the touch panel 30 detects any input in the second display region. When an input is detected in the second display region (Yes in the step S6), the process proceeds to step S8. When no input is detected in the second display region (No in the step S6), the process returns to the step S5 and the processing is continued.

In the step S7, the second display region is reduced or hidden, and the first display region is enlarged. The first display region may be restored to its original size and returned to its original position before the reduction.

In the step S8, the control unit 10 performs processing such as launching a second application according to the input detected in the second display region. The process returns to the step S5 and the processing is continued.

Figure 11A:
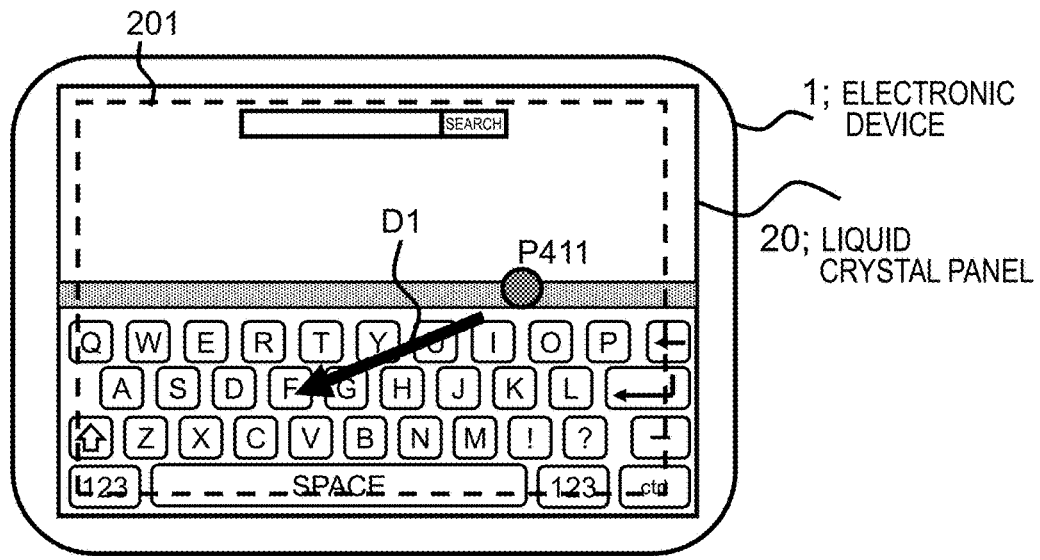
FIGS. 11A and 11B are drawings showing display examples of the liquid crystal panel 20.
Figure 11B:
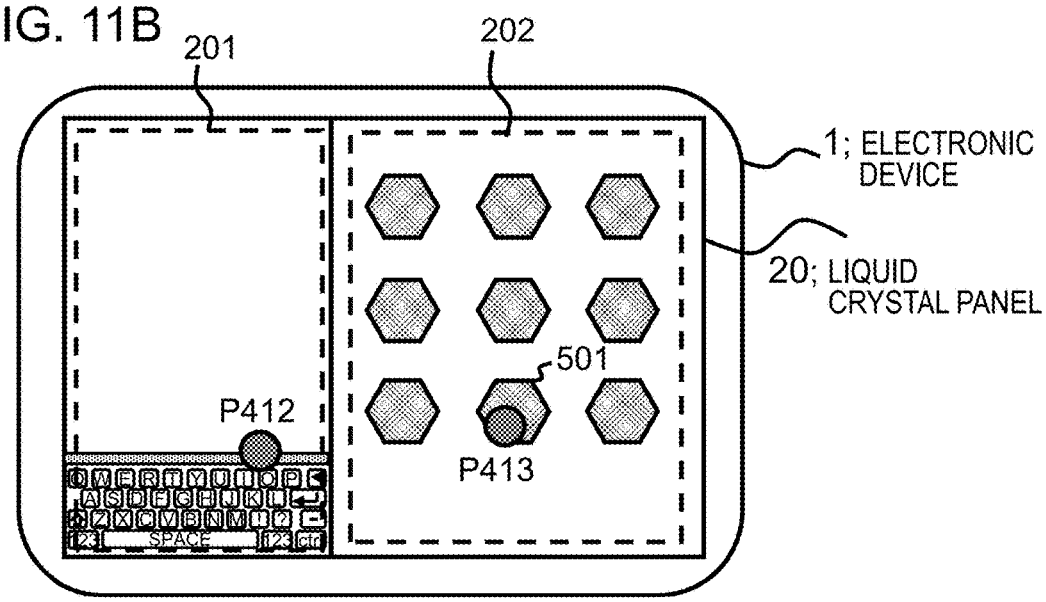

FIGS. 11A and 11B are drawings showing display examples of the second display region. First, in FIG. 11A, the software keyboard is displayed in the first display region 201. Further, the first display region 201 occupies the entire screen of the liquid crystal panel 20 in FIG. 11A. Let's assume that the touch panel 30 has detected an input at the position of a point P411 in the state of FIG. 11A and then the detected position has moved in the direction of an arrow D1. In other words, the user has performed a flick or slide operation from the point P 411 in the direction of the arrow D1.

In this case, as shown in FIG. 11B, the display region control unit 12 reduces the first display region 201. Then the image signal generation unit 13 reduces and displays the software keyboard in the reduced first display region 201. Here, when the touch panel 30 detects a slide operation, a point P412 denotes the position where the movement of the detected position has stopped. When the touch panel 30 detects a flick operation, P412 is the position where the touch panel 30 has detected an input within the first display region within a predetermined period of time after the flick operation. Then the image signal generation unit 13 displays the image of a second application in the second display region 202. In FIG. 11B, the image signal generation unit 13 displays the home screen in the second display region 202.

Here, let's assume that the touch panel 30 continuously detects the input in the first display region 201. In other words, the user's finger is touching (close to) the position of the point P412. In this case, the control unit 10 performs processing according to an input on the second display region. For instance, let's assume that the touch panel detects an input at the position of an icon 501 (the position of a point P413) in the second display region in FIG. 11B. In this case, the control unit 10 performs processing according to the input on the icon 501.

For instance, let's assume that the touch panel 30 detects a tap operation on an icon that launches an application in the second display region 202. In this case, the image signal generation unit 13 displays the image of the selected application in the second display region 202. Further, at this time, the image signal generation unit 13 continues to display the image in the first display region 201.

[Modification 1]

As modification 1 of the electronic device 1 relating to the first exemplary embodiment, the input determination unit 11 may disable the multi-screen cancellation operation for a predetermined period of time after a multi-screen transition operation. For instance, there is a possibility that the user lifts his finger from the first display region on the touch panel 30 immediately after he performs a slide operation as a multi-screen transition operation. In this case, despite the multi-screen transition operation performed by the user, the display immediately returns to the state in which the first display region is enlarged. Therefore, it is preferred that the display region control unit 12 should not enlarge the first display region for a predetermined period of time after reducing the first display region. As a result, the user can change the finger for touching (getting close to) the first display region for a predetermined period of time after the first display region is reduced. For instance, let's say that he performed a multi-screen transition operation with his right index finger. The user is able to change the finger for touching (getting close to) the first display region to his left thumb for a predetermined period of time.

As described, the electronic device 1 relating to the present exemplary embodiment is able to display images of a plurality of applications simultaneously. Further, with the electronic device 1 relating to the present exemplary embodiment, while the software keyboard is being used, an operation on another application can be performed. Therefore, with the electronic device 1 relating to the present exemplary embodiment, an operation independent from the software keyboard can be easily performed while the software keyboard is being used.

[Exemplary Embodiment 2]

Next, a second exemplary embodiment will be described in detail using the drawings.

An electronic device 1 relating to the present exemplary embodiment changes the size and position of a software keyboard without displaying a plurality of applications. Note that the description that overlaps with the first exemplary embodiment will be omitted in the description of the present exemplary embodiment. Further, the same signs are given to the elements same as those in the first exemplary embodiment and the explanation thereof will be omitted in the description of the present exemplary embodiment.

When the touch panel 30 detects a multi-screen transition operation at a predetermined position, the image signal generation unit 13 changes the position of the software keyboard. In the electronic device 1 relating to the present exemplary embodiment, a region in which the software keyboard is displayed is the first display region. Further, in the electronic device 1 relating to the present exemplary embodiment, a region excluding the software keyboard is the second display region. Note that the description of the operation to restore the display modes of the first and second display regions (corresponding to the multi-screen cancellation operation) will be omitted since it is the same as that of the electronic device 1 relating to the first exemplary embodiment.

Figure 12A:
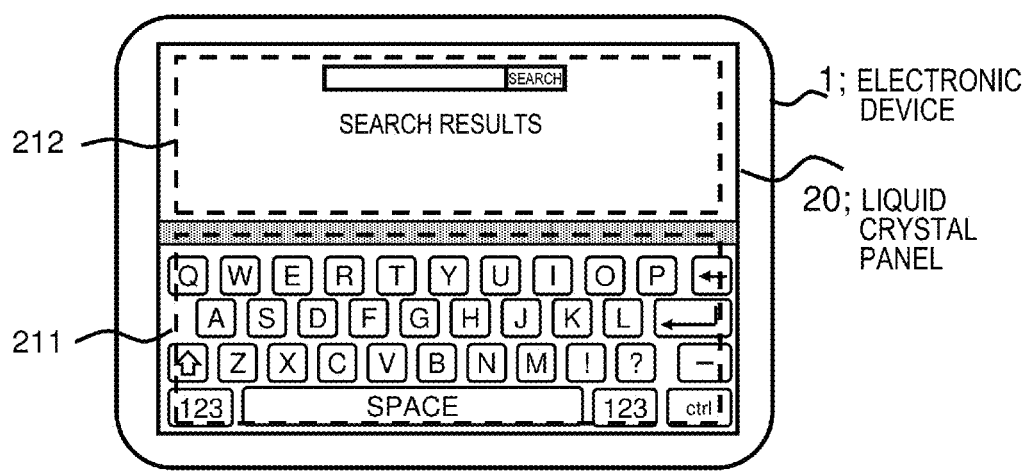
FIGS. 12A and 12B are drawings showing display examples of the liquid crystal panel 20.
Figure 12B:
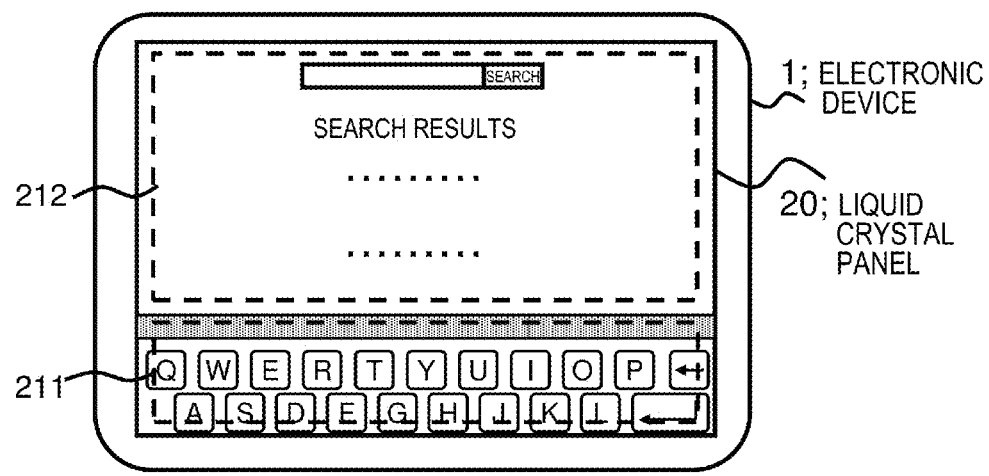

FIGS. 12A and 12B are drawings showing display examples of the liquid crystal panel 20. FIG. 12B shows an example in which the software keyboard is moved down from a state shown in FIG. 12A. As shown in FIGS. 12A and 12B, the electronic device 1 relating to the present exemplary embodiment lowers the position of the software keyboard. As a result, the second display region 212 is enlarged due to the fact that the first display region 211 is reduced.

For instance, when the user enters characters into a Web browser, he may want to confirm search results in the middle of entering characters. In this case, the electronic device 1 relating to the present exemplary embodiment is able to move the display of the software keyboard and enlarge the display region of search results based on a simple and easy operation.

Next, the operation of the electronic device 1 relating to the present exemplary embodiment will be described.

Figure 13:
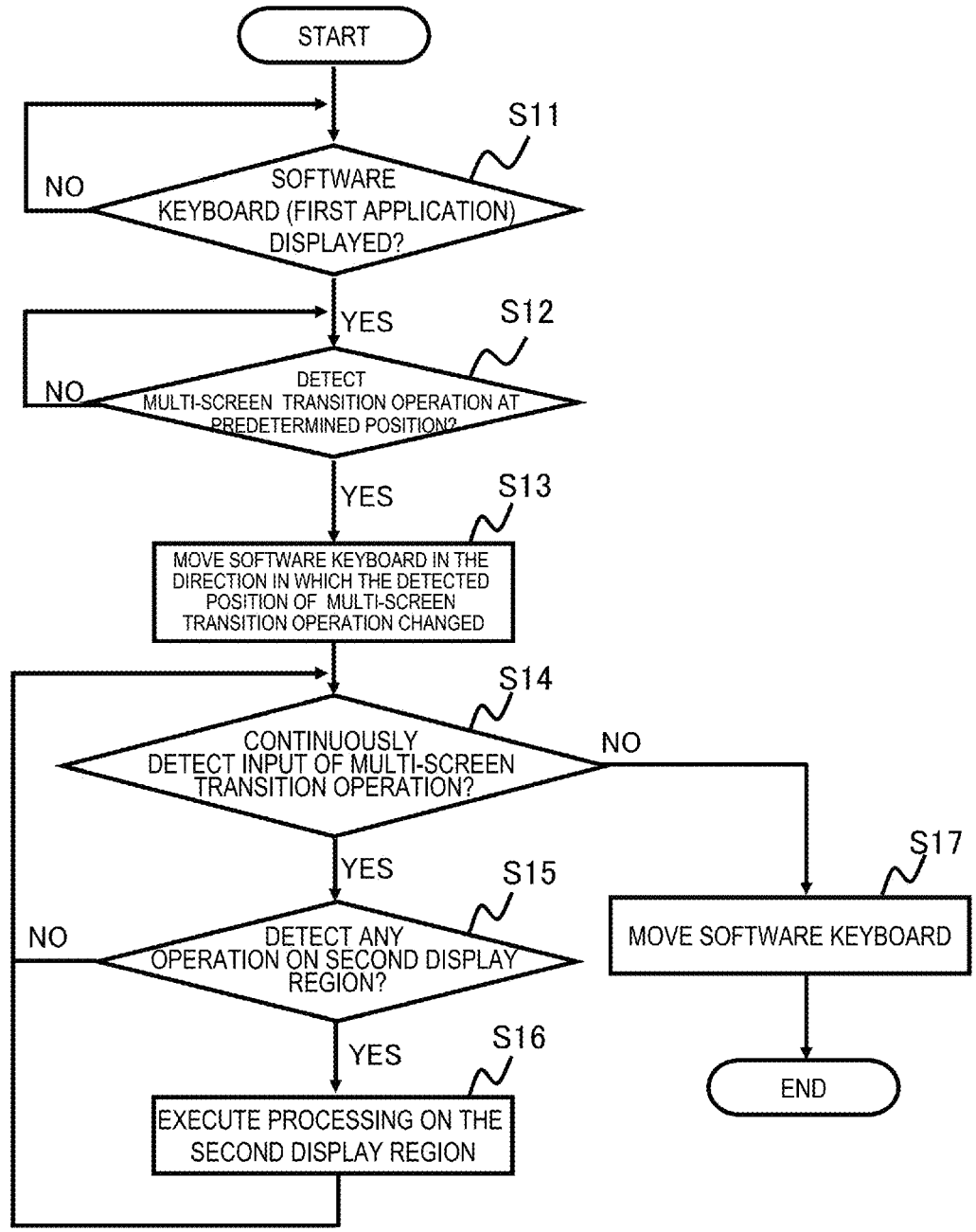
FIG. 13 is a flowchart showing an operation example of an electronic device 1 relating to a second exemplary embodiment.

FIG. 13 is a flowchart showing an operation example of the electronic device 1 relating to the present exemplary embodiment. Note that steps S11 and S12 are the same as the steps S1 and S2, respectively, and the explanation will be omitted.

In step S13, the display region control unit 12 moves the first display region in the direction in which the detected position of a multi-screen transition operation moved. In an example of FIG. 13, the software keyboard is displayed as if a part thereof goes off the screen with only the remaining part displayed.

In step S14, the input determination unit 11 determines whether or not the touch panel 30 continuously detects the input of the multi-screen transition operation. When the input is continuously detected (Yes in the step S14), the process proceeds to step S15. When the input is not detected (No in the step S14), the process proceeds to step S17.

In the step S15, the input determination unit 11 determines whether or not the touch panel 30 detects any input in the second display region. When an input is detected in the second display region (Yes in the step S15), the process proceeds to step S16. When no input is detected in the second display region (No in the step S15), the process returns to the step S14 and the processing is continued.

In the step S16, the control unit 10 performs processing according to the input detected in the second display region. Then the process returns to the step S14 and the processing is continued.

In the step S17, the control unit 10 enlarges the first display region. In this case, the first display region may be restored to its original size and the software keyboard may be returned to its original position.

Figure 14A:
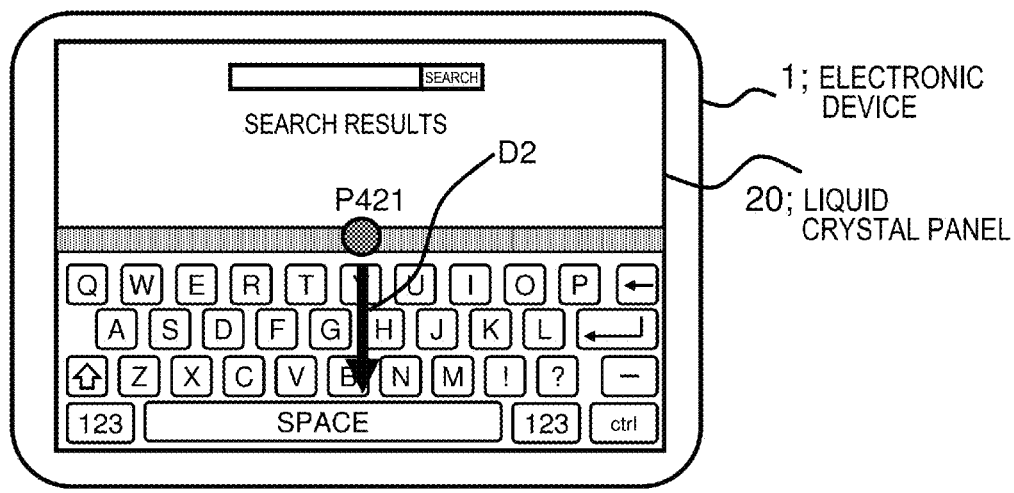
FIGS. 14A and 14B are drawings showing display examples of the liquid crystal panel 20.
Figure 14B:
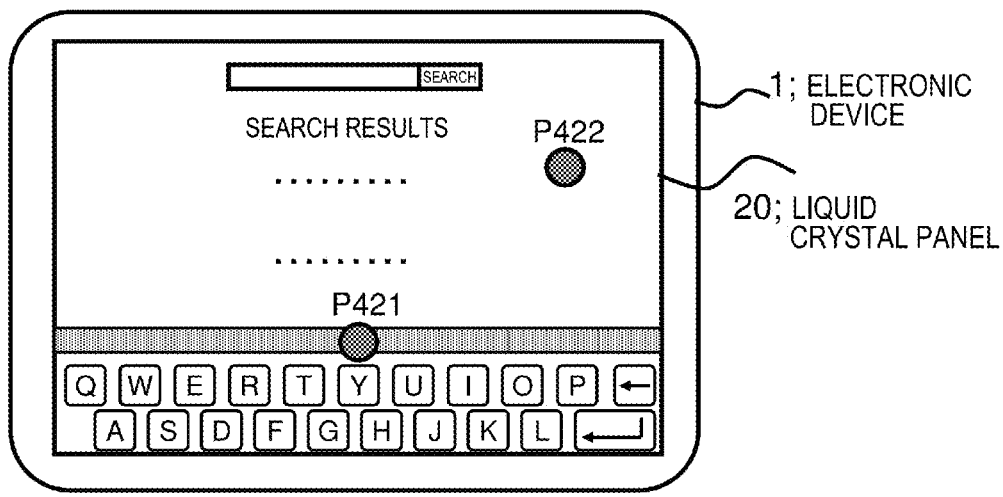

FIGS. 14A and 14B are drawings showing an example of how the display mode of the software keyboard changes. In FIG. 14A, a Web browser is displayed on the liquid crystal panel 20 as a first application. Further, the software keyboard is displayed on the liquid crystal panel 20 in FIG. 14A. Here, let's assume that the touch panel 30 detects an input (detects a multi-screen transition operation) at the position of a predetermined point P421 of the software keyboard and the detected position of the multi-screen transition operation moves in the direction of an arrow D2. In this case, the display region control unit 12 reduces the first display region in the direction of the arrow D2 as shown in FIG. 14B. Then the image signal generation unit 13 moves the software keyboard to the first display region and displays it therein.

Further, when the touch panel 30 continues to detect the input at the position of the point P421 as shown in FIG. 14B, the control unit 10 performs processing according to an input at a point P422. For instance, the control unit executes processing such as scrolling the Web browser screen, selecting a region, etc. according to the input at the point P422.

As described, the electronic device 1 relating to the present exemplary embodiment changes the position of the software keyboard. As a result, the electronic device 1 relating to the present exemplary embodiment is able to perform an operation independent from the software keyboard while the software keyboard is being used by an application.

[Exemplary Embodiment 3]

Next, a third exemplary embodiment will be described in detail using the drawings.

In the third exemplary embodiment, the software keyboard is reduced and displayed near a position where the touch panel has detected an input. Note that the description that overlaps with the first exemplary embodiment will be omitted in the description of the present exemplary embodiment. Further, the same signs are given to the elements same as those in the first exemplary embodiment and the explanation thereof will be omitted in the description of the present exemplary embodiment.

When the touch panel 30 detects an input, the image signal generation unit 13 reduces the software keyboard and displays it near the position where the input is detected. More concretely, the image signal generation unit 13 reduces the software keyboard and displays it within a predetermined range based on the position where a multi-screen transition operation has been detected. In other words, the display region control unit 12 changes the display mode of a display region based on a contact (proximity) operation at one place.

Figure 15A:
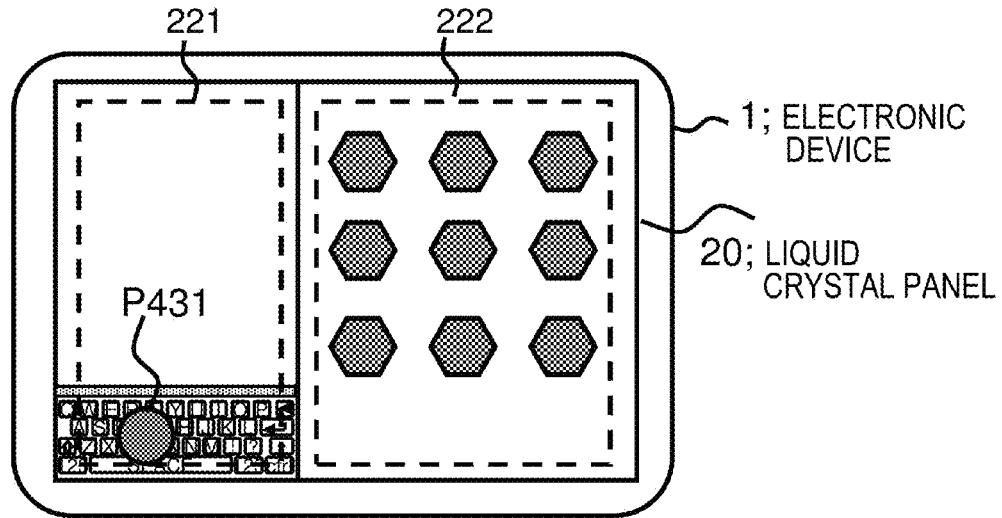
FIGS. 15A and 15B are drawings showing display examples of the liquid crystal panel 20.
Figure 15B:
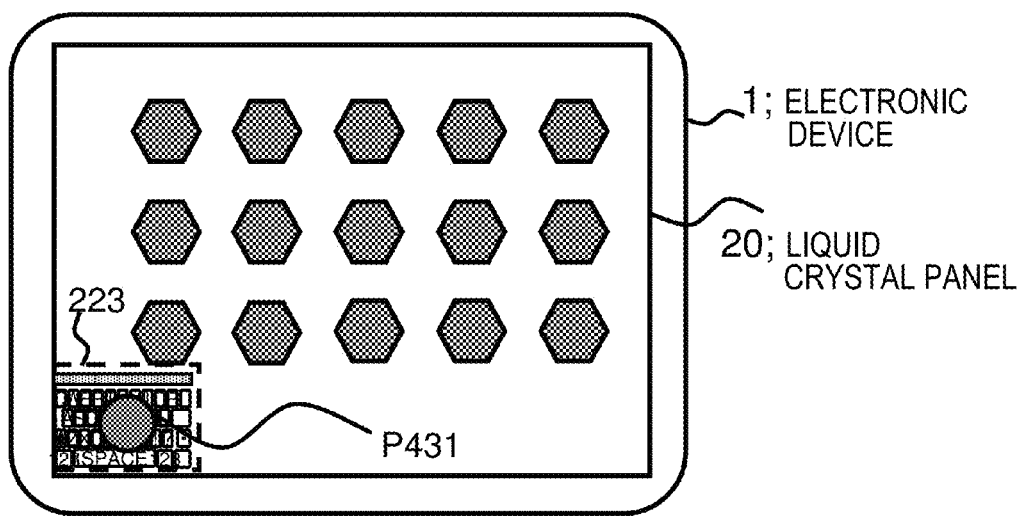

FIGS. 15A and 15B are drawings showing display examples of the liquid crystal panel 20. In FIG. 15A, first and second display regions 221 and 222 are displayed on the screen. In the first display region 221, a reduced software keyboard is displayed. The second display region 222 displays the home screen.

Let's assume that the touch panel 30 detects an input at the position of a point P431 in FIG. 15A. In this case, as shown in FIG. 15B, the display region control unit 12 reduces the first display region and moves it to a position near the point P431. In FIG. 15B, the moved first display region is referred to as a first region 223. Further, in FIG. 15B, the point P431 becomes the center of the software keyboard and the software keyboard is reduced to a size that does not go off the screen of the liquid crystal panel, but the present exemplary embodiment is not limited thereto. Then the image signal generation unit 13 displays the software keyboard in the first display region 223. At this time, the display region control unit 12 further reduces the first display region from the state of the first display region 221 shown in FIG. 15A. Then the display region control unit 12 enlarges the size of the second display region.

In other words, in the case of FIGS. 15A and 15B, the image signal generation unit 13 enlarges the display of the home screen. Further, when the touch panel 30 stops detecting any input at the point P431, the display region control unit 12 returns the display mode of the display regions to the state shown in FIG. 15A.

As described, the electronic device 1 relating to the present exemplary embodiment reduces the software keyboard and displays it near the position where the touch panel has detected an input. Therefore, in the electronic device 1 relating to the present exemplary embodiment, the display regions of the home screen and an application launched by selecting the icon thereof on the home screen will be larger. As a result, the electronic device 1 relating to the present exemplary embodiment facilitates the user to operate a running application, offering even more user-friendliness.

Further, the cases where a software keyboard is displayed have been described in the exemplary embodiments above, however, a plurality of display regions that receive independent operations may be displayed in a state in which no software keyboard is displayed. In this case, the display mode of each display region can be also changed based on an easy and simple operation.

Finally, preferred modes will be summarized.
(Mode 1)

As the electronic device relating to the first aspect.
(Mode 2)

The electronic device, wherein the control unit reduces a size of the first display region based on the second operation.
(Mode 3)

The electronic device, wherein the second display region includes a region made blank due to the fact that the first display region is reduced.
(Mode 4)

The electronic device, wherein the control unit changes position of the first display region based on the second operation.
(Mode 5)

The electronic device, wherein the control unit changes the second image to an image corresponding to an application when the application is run based on the third operation.
(Mode 6)

The electronic device, wherein the control unit has the second image displayed in the second display region when the input detection unit detects a predetermined operation in the first display region after detecting the second operation.
(Mode 7)
The electronic device, wherein the control unit reduces the first display region within a predetermined range according to a detected position of the predetermined operation.
(Mode 8)
The electronic device, wherein the first image is an image representing a software keyboard that receives the first operation.
(Mode 9)
As the controlling method for an electronic device relating to the second aspect.
(Mode 10)
The controlling method for an electronic device comprising reducing a size of the first display region based on the second operation changing position of the first display region based on the second operation when the first image is displayed in the first display region.
(Mode 11)
The controlling method for an electronic device comprising executing an application based on the third operation and changing the second image to an image corresponding to the application when the application is executed displaying the first image in the first display region.
(Mode 12)
The controlling method for an electronic device, wherein, when a contact operation or a proximity operation performed by a user is detected, a predetermined operation is detected in the first display region after the second operation is detected, and having the second image displayed in the second display region when the predetermined operation has been detected.
(Mode 13)
As the program relating to the third aspect.
(Mode 14)
The program executing reducing a size of the first display region based on the second operation and changing position of the first display region based on the second operation when the first image is displayed in the first display region.
(Mode 15)
The program executing running an application and changing the second image to an image corresponding to the application when the application is run based on the third operation displaying the first image in the first display region.
(Mode 16)
The program detecting a predetermined operation in the first display region after detecting the second operation when a contact operation or a proximity operation performed by a user is detected and having the second image displayed in the second display region displaying the first image in the first display region when the predetermined operation has been detected.

It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications aforementioned. The ranges of the numerical values used in the present description should be interpreted as a specific numeric value or small range included in the ranges even in cases where it is not stated so.

1, 100: electronic device
10, 103: control unit
11: input determination unit
12: display region control unit
13: image signal generation unit
20: liquid crystal panel
30: touch panel
101: input detection unit
102: display unit
201, 211, 221, 223: first display region
202, 212, 222: second display region
203: third display region
501: icon

The invention claimed is:

1. An electronic device comprising:
an input detection hardware unit that detects a contact operation or a proximity operation performed by a user;
a display panel that includes a first display region displaying a first image and an image of a first application, wherein the first image shows a position where a first operation is received; and
a control unit that changes display mode of the first display region based on a flick operation or a slide operation detected as a second operation when the input detection hardware unit detects the flick operation or the slide operation as the second operation,
wherein the control unit reduces a size of the first display region based on the second operation, displays a second image of a second application in a second display region made available due to the reduction of the size of the first display region, while the control unit keeps displaying at least the first image or the image of the first application, and has the second image displayed in the second display region where a third operation is received,
wherein, in a case where the input detection hardware unit detects the flick operation as the second operation, the control unit moves the first display region in a direction in which a position where the flick operation is detected is moved, and
wherein in a case where the input detection hardware unit detects the slide operation as the second operation, the control unit reduces the first display region and moves the first display region in which a position where the slide operation is detected is moved.

2. The electronic device according to claim 1, wherein the second display region includes a region made blank due to the fact that the first display region is reduced.

3. The electronic device according to claim 1, wherein the control unit displays the second image in the second display region when the second application is initiated based on input from the third operation.

4. The electronic device according to claim 1, wherein the control unit has the second image displayed in the second display region when the input detection hardware unit detects a predetermined operation in the first display region after detecting the second operation.

5. The electronic device according to claim 4, wherein the control unit reduces the first display region within a predetermined range according to a detected position of the predetermined operation.

6. The electronic device according to claim 1, wherein the first image is an image representing a software keyboard that receives the first operation.

7. A controlling method for an electronic device comprising a display panel that includes a first display region, the controlling method comprising:
detecting a contact operation or a proximity operation performed by a user;

displaying a first image and an image of a first application, wherein the first image shows a position where a first operation is received in the first display region;

changing display mode of the first display region based on a flick operation or a slide operation detected as a second operation when the flick operation or the slide operation is detected as the second operation and having a second image displayed in a second display region where a third operation is received;

reducing a size of the first display region based on the second operation; and making the second display region available due to the reduction of the size of the first display region, while keeping displaying at least the first image or the image of the first application, wherein, in a case where the flick operation is detected as the second operation, the first display region is moved in a direction in which a position where the flick operation is detected is moved, and wherein in a case where the slide operation is detected as the second operation, the first display region is reduced and moved in which a position where the slide operation is detected is moved.

8. The controlling method for an electronic device according to claim 7 comprising executing an application based on input from the third operation and displaying the second image in the second display region when the second application is executed displaying the first image in the first display region.

9. The controlling method for an electronic device according to claim 7, wherein when a contact operation or a proximity operation performed by a user is detected, a predetermined operation is detected in the first display region after the second operation is detected, and having the second image displayed in the second display region when the predetermined operation has been detected.

10. A non-transient computer-readable storage medium having recorded thereon a program executed by a computer that controls an electronic device comprising a display panel that includes a first display region, wherein the program executes:

detecting a contact operation or a proximity operation performed by a user;

displaying a first image and an image of a first application, wherein the first image shows a position where a first operation is received in the first display region;

changing display mode of the first display region based on a flick operation or a slide operation detected as a second operation when the flick operation or the slide operation is detected as the second operation and having a second image displayed in a second display region where a third operation is received;

reducing a size of the first display region based on the second operation; and making the second display region available due to the reduction of the size of the first display region, while keeping displaying at least the first image or the image of the first application, wherein, in a case where the flick operation is detected as the second operation, the first display region is moved in a direction in which a position where the flick operation is detected is moved, and wherein in a case where the slide operation is detected as the second operation, the first display region is reduced and moved in which a position where the slide operation is detected is moved.

11. The medium according to claim 10 wherein the program executes running an application and displaying the second image in the second display region when the second application is initiated based on input from the third operation displaying the first image in the first display region.

12. The medium according to claim 10 wherein the program executes detecting a predetermined operation in the first display region after detecting the second operation when a contact operation or a proximity operation performed by a user is detected and having the second image displayed in the second display region when the predetermined operation has been detected.

13. The electronic device according to claim 2, wherein the control unit displays the second image in the second display region when the second application is initiated based on input from the third operation.

* * * * *